Nov. 19, 1940.    C. W. BONDURANT    2,221,907

THERMOSTATICALLY OPERATED SWITCH MECHANISM

Filed April 27, 1939    2 Sheets-Sheet 1

INVENTOR
CARLTON W. BONDURANT
BY Hyde, Higley & Meyer
ATTORNEYS

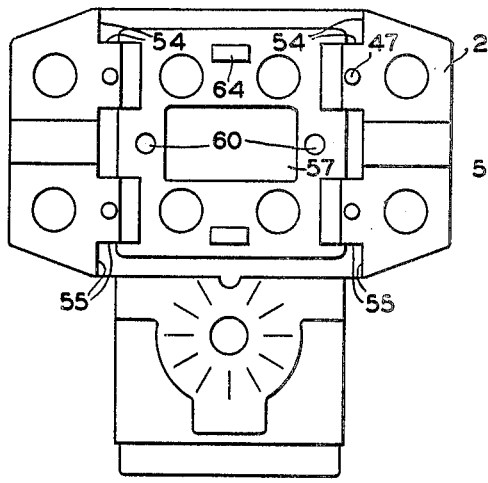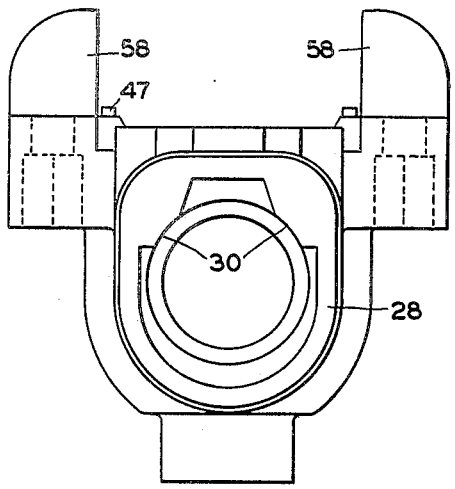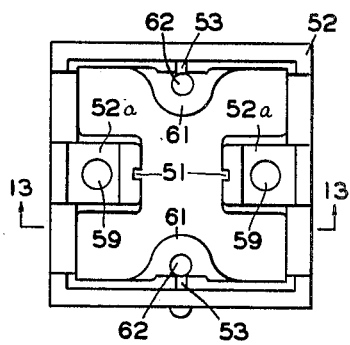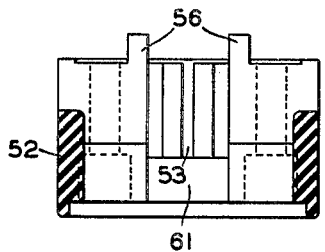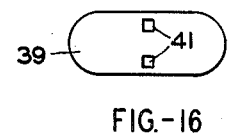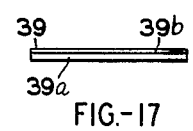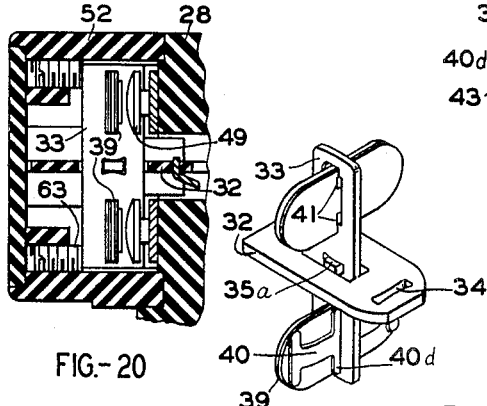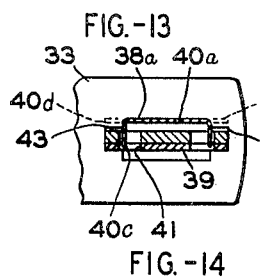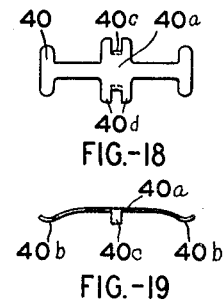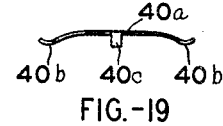

Patented Nov. 19, 1940

2,221,907

UNITED STATES PATENT OFFICE 2,221,907

THERMOSTATICALLY OPERATED SWITCH MECHANISM

Carlton W. Bondurant, Euclid, Ohio, assignor to The Titan Valve and Manufacturing Company, Cleveland, Ohio, a corporation of Ohio Application April 27, 1939, Serial No. 270,331

14 Claims. (Cl. 200—137)

This invention relates to improvements in thermostatically operated switch mechanisms.

One of the objects of the present invention is to provide a very light but efficient contact closing mechanism which may be reliably operated by the comparatively light forces of the usual thermostatically operated device. In carrying out the above purpose I have provided a few parts cheaply and easily assembled and so put together and guided in a surrounding casing that the parts move as easily as possible and with a minimum of friction.

Another object of the present invention is to provide an arrangement of contact members on the casing which may be readily assembled in different positions so that in one arrangement contacts may be made by movement of the thermostat in one direction and when assembled in another manner contacts may be broken by movement of the thermostat in the same direction.

Another object of the present invention is to provide a novel arrangement of a movable contact member in its supporting part so that contact is made and broken in an efficient manner yet at the same time it is possible to assemble the parts very easily with the movable contact member facing in either of two directions as desired.

Other novel features include the casing particularly designed to hold and cooperate with both the movable and fixed contact parts and arranged for cheap manufacture and quick assembly and disassembly operations.

Further novel features will appear from the accompanying specification and drawings and the essential features thereof will be set forth in the claims.

Figure 1:
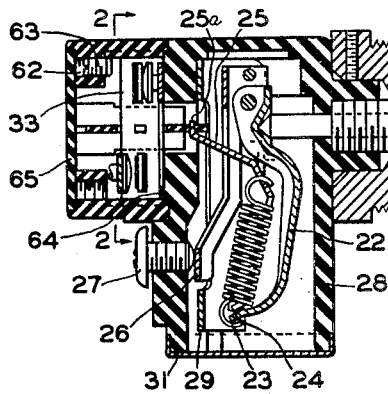
Figure 2:
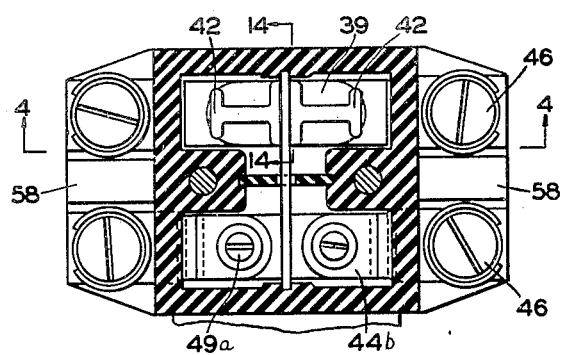
Figure 3:
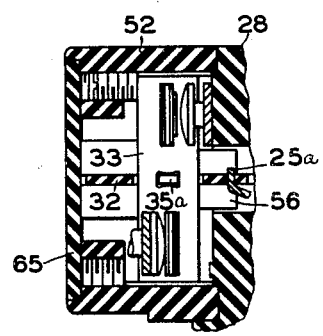
Figure 4:
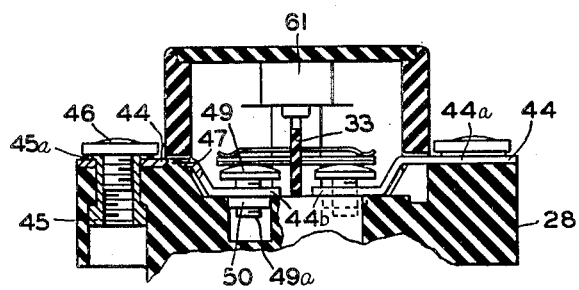
Figure 6:
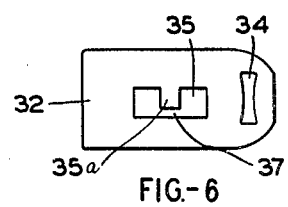
Figure 5:
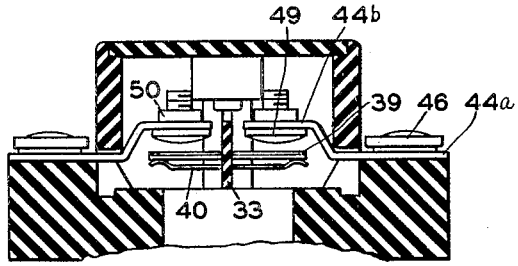
Figure 7:
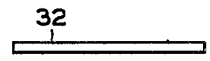
Figure 8:
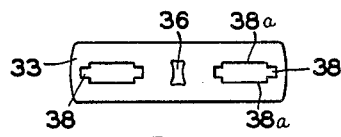
Figure 9:

In the drawings, Fig. 1 is a longitudinal sectional view through my improved switch mechanism shown in combination with one type of thermostatic device; Fig. 2 is a partial sectional view enlarged taken along the line 2—2 of Fig. 1; Fig. 3 is an enlarged sectional view similar to Fig. 1 but showing another position of the parts; Fig. 4 is a fragmental sectional view taken along the line 4—4 of Fig. 2; Fig. 5 is a view similar to Fig. 4 but showing the fixed and movable contact members assembled for engagement of the fixed contacts by the movement of the movable contact member in the opposite direction; Figs. 6 and 7 are a top plan view and side elevation respectively of the member which connects the thermostatic device with the switch parts; Figs. 8 and 9 are top plan view and side elevation respectively of the movable contact supporting member; Fig. 10 is a face view of the main portion of the casing with the switch enclosing portion removed; Fig. 11 is a bottom plan view of the main casing portion of Fig. 10; Fig. 12 is an end view of the switch enclosing portion of the casing; Fig. 13 is a sectional view of the same taken along the line 13—13 of Fig. 12; Fig. 14 is a fragmental sectional view enlarged taken along the line 14—14 of Fig. 2; Fig. 15 is a perspective view of the assembled movable parts of the switch mechanism; Figs. 16 and 17 are top plan view and side elevation respectively of one of the movable contact members; Figs. 18 and 19 are top plan view and side elevation of a spring associated with the movable contact member; while Fig. 20 is a view similar to Fig. 3 showing another modification.

In Fig. 1 I have illustrated the switch mechanism associated with a snap acting thermostat of a type fully shown, described and claimed in the copending application of Joseph A. Cerny, Serial No. 178,927, filed December 9, 1937, to which further reference may be had for details of the thermostatic mechanism. For the present purpose it is sufficient to state that relative expansion between the parts 20 and 21 under varying heating conditions causes a movement of the part 22 which carries the end of spring 23 from one side to the other of the fulcrum 24 of lever 25. This causes a snap movement of the tongue 25a back and forth from right to left as viewed in Fig. 1 in response to the heating and cooling of the thermostatic members. The lever 26 controlled by the adjusting screw 27 is for the purpose of setting the thermostat to act at different temperatures. This snap acting portion of the thermostat is housed in a main casing 28 with the member 29 firmly held against the shoulders 30 (Fig. 11). It will be noted that the lower end of the casing 28 is open so that the thermostat parts may be assembled and disassembled through this opening as described in the above referred to copending application. A cap 31 is snapped onto the lower end of the casing 28 to close the lower end thereof. It will be understood by those skilled in this art that other thermostatic devices may be used in combination with my switch mechanism in which case it is only necessary to connect the switch mechanism at the point 25a to whatever thermostatic device is used.

Referring chiefly to Fig. 15 and to other figures in amplification thereof, the movable switch parts comprise a support member and a connecting member and in the present instance these are two sheets of insulating material 32 and 33 assembled at right angles to each other. Suitable material for this purpose is "micarta" but other materials will readily occur to those skilled in this art. The sheet 32 shown in Figs. 6 and 7 is approximately an inch long and three sixty-fourths of an inch thick. The sheet 33 shown in Figs. 8 and 9 is approximately one and one-eighth inches long and three sixty-fourths of an inch thick. Therefore these parts are extremely light. A slotted opening 34 in sheet 32 engages over the tongue 25a of the thermostatic device. Through a slotted opening 35 in the sheet 32 passes the sheet 33. A tongue 35a of sheet 32 enters the opening 36 of sheet 33 so as to secure the two sheets together. It will be understood that the sheet 33 is first passed through the space 37 to bring the tongue 35a and the opening 36 into alinement, after which the parts are easily and quickly assembled. It will be noted that the sides of openings 34 and 36 are curved so as to permit freedom of movement of the parts.

The sheet 33 is provided with slotted openings 38, one at each end and equally spaced from the center. These openings have a main portion of full length and wider portions 38a of less length for a purpose to be presently described. A movable contact member 39 passes through each of the slots 38 and is held therein by a spring 40. The movable contact member as shown in Figs. 16 and 17 is an elongated piece of flat metal approximately thirteen sixteenths inch long and four hundredths of an inch in total thickness with the ends rounded as shown in Fig. 16 and with two openings 41 passing through the member at the center. Referring to Fig. 17 the member 39 has a main portion 39a of copper with a thin coating 39b of fine silver on one face. This is the face which makes the electrical contact. Referring to the spring 40 shown in Figs. 18 and 19 and to the assembled views thereof in Figs. 2 and 14, it will be noted that in its assembled position one face of the spring in the center at 40a engages the wider portion of the slot 38a. The end portions of the spring 40b on the other face engage the back of the contact member 39 at the point 42. Struck up from the metal of the spring (which is of brass three thousandths of an inch thick) are two tongues 40c of a width approximately equal to the thickness of the sheet 33. In the assembled position as shown in Fig. 14 these tongues enter the openings 41 in the contact member 39. At the same time the spring action forces the portion 40a of the spring into the parts 38a of the slot 38 and the wings 40d embrace the sheet 33 on each side of the slotted opening. These parts are assembled by simply holding the spring flat against the contact member while the latter is pushed through the slot 38 to the proper position. The spring 40 then holds the contact member yieldingly in the slot 38 and at the same time fixes the contact member in evenly balanced position in the sheet 33 as shown in Fig. 15. The contact member 39 may be easily disassembled and reversed in position by again pressing the spring 40 flat against the member 39. It will be noted that there is some play in the slot 38 as at the point 43 which permits the easy assembling of the parts.

Fixed contacts are secured to the casing in position to be engaged by the moving contact members 39. It is possible to arrange these contacts in any desired manner. For instance referring to Fig. 15 the upper member 39 is shown in position to make contact toward the right while the lower member 39 is arranged to make contact toward the left. It will be understood however that both members 39 might make contact either to the right or to the left if desired as shown in Fig. 20. Referring to Fig. 4 the fixed contacts for engaging the upper contact member 39 are shown at 44. These contacts have a securing portion 44a by which they are fixed to the casing 28 and an offset portion 44b where the contacts are carried. In the form shown a grommet 45 in the casing 28 passes upwardly through an opening in the portion 44a and is peened over as at 45a to hold the contact 44 securely in position. A binding post to secure electric wires is indicated at 46. A nubbin 47 on the casing 28 keeps the contact 44 from turning. An adjustable contact 49 is threaded through the boss 50 of the portion 44b. This contact has a screw head at the end 49a and once the contact is properly adjusted a bit of solder may be placed over this head to prevent unauthorized tampering.

The arrangement of the parts is such that the contacts 44 may be assembled in the opposite direction as shown in Fig. 5 so as to permit a making of the contacts by movement of the movable switch parts in a direction opposite to that shown in Fig. 4. To this end the portion 44a of the contact 44 lies approximately in the same plane as the movable contact member 39. Thus the parts may be assembled with the offset portion 44b turned oppositely to the position shown in Fig. 4 so as to hold the contacts 49 on the other side of the contact member 39 as shown in Fig. 5. Of course in this construction the contact member 39 is reverse as has been previously described. It is this arrangement of contacts which is shown in Figs. 1, 2, 3 and 15 for coacting with the lower movable contact member 39.

It will be noted that the movable contact parts are evenly balanced, that is to say, the sheet 32 engages the sheet 33 at its center and this in turn engages each of the contact members 39 at its center. Thus 33 acts as an equalizer bar to obtain uniform action at each end thereof, and each contact bar 39 equalizes the action at its two ends. All of the parts are loosely fitting for ease in assembly and to avoid friction and to permit all of the parts to assume the desired positions as contact is made and broken. It is therefore desirable to guide the sheets 32 and 33 during their movement back and forth. To this end the sheets have their ends or edges squared off or cut along lines substantially parallel to the direction of movement of the parts. Grooves 51 in the supplemental casing portion 52 best seen in Fig. 12 loosely engage the side edges of sheet 32 to guide the movement thereof. Grooves 53 engage the end edges of sheet 33 to guide the movement of that part. These end edges are slightly arcuate to prevent binding of the parts.

Referring to Figs. 12 and 13 it will be noted that the supplemental casing portion 52 slides into position in the main casing portion 28. When in position the casing portion 52 engages shoulders 54 and 55 on the main casing and the tongues 56 enter the opening 57. Wings 58 extend upwardly from the top of casing 28 so as to separate adjacent binding posts 46. The projections 52a on the inner face of the casing portion 52 carry the grooves 51 as already described and also have openings 59 through which securing screws pass into threaded openings 60 in the casing 28 so as to hold the casing parts assembled. Also on the inner face of the casing portion 52 are projections 61 which have threaded openings 62. When the contacts are arranged as shown in Figs. 1, 2 and 3, a screw 63 is passed through the upper opening 62 so as to limit the movement of sheet 33 toward the left when making contact at the lower contact points. In other words it is necessary to limit the movement of the upper end of sheet 33 in order to insure perfect contact at the lower contacts. In a like fashion the casing 28 has raised points 64 (Figs. 1 and 10) which limit the motion of the lower end of sheet 33 toward the right when contact is made at the upper contacts.

Obviously the casing portions 28 and 52 might be made of any suitable material providing electrical parts carried thereby were suitably insulated. Preferably however I make both of these casing portions of insulating material as for instance, "Bakelite." Referring to Figs. 1 and 3, the left end of casing portion 52 has an opening for inspection and access to the switch parts and which may be closed by a plate 65 which also covers the adjusting screws so that they are not easily tampered with.

It is thought the operation of the device will be clear from the previous description. When the rod 20 moves sufficiently to the left the tongue 25a is snapped toward the left as viewed in Fig. 1, moving both of the contact members 39 toward the left so as to break the upper set of contacts and to make the lower set of contacts. On movement of rod 20 to the right the reverse movement takes place.

When either of the contact members 39 is held in engagement with a pair of contacts 49 the comparatively light spring 40 of the involved contact member 39 is compressed. It results from this construction that as the tongue 25a starts to move the parts, the spring 40 keeps the contacts 39 and 49 in engagement until all slack in the movable switch parts has been taken up whereupon the contact member 39 is moved sharply away from the contacts 49 with which it was engaged. This results in a quick, clean break.

What I claim is:

1. In the combination of a thermostatically actuated device and a switch mechanism operated thereby and positioned in a casing, a pair of fixed contacts on said casing, a plate contact member adapted to coincidentally engage both of said contacts, a sheet of insulating material movable in a plane normal to said plate and between said fixed contacts, there being a slotted opening in said sheet through which said contact member passes, said fixed contacts being equally spaced on opposite sides of said sheet, a flat spring in said slot and engaging opposite ends of said plate member to yieldingly urge the latter toward said contacts, and an operative connection between said sheet and said device for moving said member into and out of contact-making position responsive to movement of said device.

2. In the combination of a thermostatically actuated device and a switch mechanism operated thereby and positioned in a casing, a movable contact carrying member of insulating material, an operative connection between the central portion of said member and said device, there being two slotted openings through said member, one at each end thereof and equally spaced from said central connection, a contact plate passing through each opening at right angles to said member and extending equally on opposite sides thereof, two pairs of contacts carried by said casing, each pair respectively having its contacts lying on opposite sides of said member and engageable by opposite ends of one of said contact plates, and the parts being so arranged that movement of said device makes and breaks the electrical connection between each contact plate and its associated contacts.

3. The combination of claim 2 including means yieldingly holding each contact plate in its associated slot for limited movement in the direction of plate movement.

4. The combination of claim 2 in which said operative connection comprises a member of insulating material at right angles to said first named member, and there being a separable connection between said two members.

5. The combination of claim 2 in which said operative connection comprises a member of insulating material at right angles to said first named member, and there being surfaces on said casing guiding said members for movement to make and break said contact engagements.

6. A switch contact assembly comprising two thin sheets of insulating material at right angles to each other, there being a slotted opening in one of said sheets, the other sheet passing through said opening and having a tongue and slot connection with said one sheet, there being two slotted openings through one of said sheets, said openings being on opposite sides of the other of said sheets and equidistant therefrom, and contact plates passing through said last named openings in planes normal to both of said sheets.

7. The combination of claim 6 including means yieldingly holding said contact plate in predetermined position in its associated slotted opening.

8. In the combination of a thermostatically actuated device and a switch mechanism operated thereby and positioned in a casing, two sheets of insulating material at right angles to each other, there being a slotted opening in one of said sheets, the other sheet passing through said opening and having a connection with said one sheet, one of said sheets having an operative connection with said device, the other of said sheets having two slotted openings through it, said openings being on opposite sides of the connected sheet and equidistant therefrom, contact plates one passing through each of said last named openings in planes normal to both of said sheets, fixed contacts on said casing, one near each end of each of said plates, the arrangement of the parts being such that movement of said device makes and breaks the engagement between said plates and said contacts as said device moves said sheets back and forth, the edges of said sheets being cut on lines substantially parallel to the direction of sheet movement, and grooves in said casing embracing the edges of said sheets to guide them.

9. In a switch contact member, the combination of a sheet of insulating material having an elongated main slot through it, said slot having a wider portion of less length than said main slot, a contact member passing through said slot, and a flat spring passing through said wider portion and having a portion snugly engaging said wider portion of said slot and having another portion engaging said contact member whereby to hold said contact member in fixed position in said slot.

10. In a switch contact member, the combination of a sheet of insulating material having an elongated main slot through it, said slot having a wider portion of less length than said main slot, a contact member passing through said slot, there being openings in said contact member where it passes through said slot, a flat metal spring passing through said wider portion of said slot and having one face engaging a wall of said wider portion of said slot and having its other face engaging said contact member at each end of said spring, there being tongues struck out of said spring metal of the width of said sheet and bent toward said contact member, said construction leaving wings on each side of said tongues, said tongues passing into said openings in said contact member and said wings embracing said sheet whereby to hold said spring in said wider portion of said slot and to hold said contact member in fixed position but yieldingly in said slot.

11. In a switch mechanism, an elongated movable contact carrying member, means guiding said member for movement transversely of its length in a plane, means for so moving said member and operatively connected therewith at a central point thereof in a manner permitting oscillation of said member in said plane about said point, two contact bars carried by said member and positioned on opposite sides of said point, each bar being operatively connected at its central point with said member in a manner permitting oscillation of the bar about its connection point, and two pairs of contacts, each pair having its contacts lying on opposite sides of said member and engageable by opposite ends of one of said contact bars, whereby each pair of contacts has uniform coaction with the ends of its associated contact bar when said member is moved.

12. In the combination of a thermostatically actuated device and a switch mechanism operated thereby and positioned in a casing, a movable contact carrying member, an operative connection between said device and said member connected at the mid-point of said member in a manner to permit oscillation of said member about said point, two contact bars carried by said member and positioned on opposite sides of said point, each bar being operatively connected at its central point with said member in a manner permitting oscillation of the bar about its connection point, and two pairs of contacts carried by said casing, each pair having its contacts lying respectively opposite the ends of one of said bars and engageable thereby by movement of said member, whereby to equalize engagement of all of said contacts by said bars.

13. In the combination of a thermostatically actuated device and a switch mechanism operated thereby and positioned in a casing, an equalizer bar pivotally connected at its mid-point to said device, a contact bar at each end of said equalizer bar, each contact bar being pivotally connected at its mid-point to said equalizer bar, and contacts on said casing, one opposite each end of each contact bar and adapted to be engaged by movement of said bars as said device is actuated.

14. In the combination of a switch mechanism and a device for actuating the same, a pair of plate members lying in planes normal to each other and one secured to the other, electrical contacts carried by one of said members, there being an operative connection between said device and one of said members and movable in substantially a straight line by said device, said plate members having edges parallel to said line, and a casing for said mechanism having grooves engaging and guiding said edges during movement of said members.

CARLTON W. BONDURANT.